Figure 1:
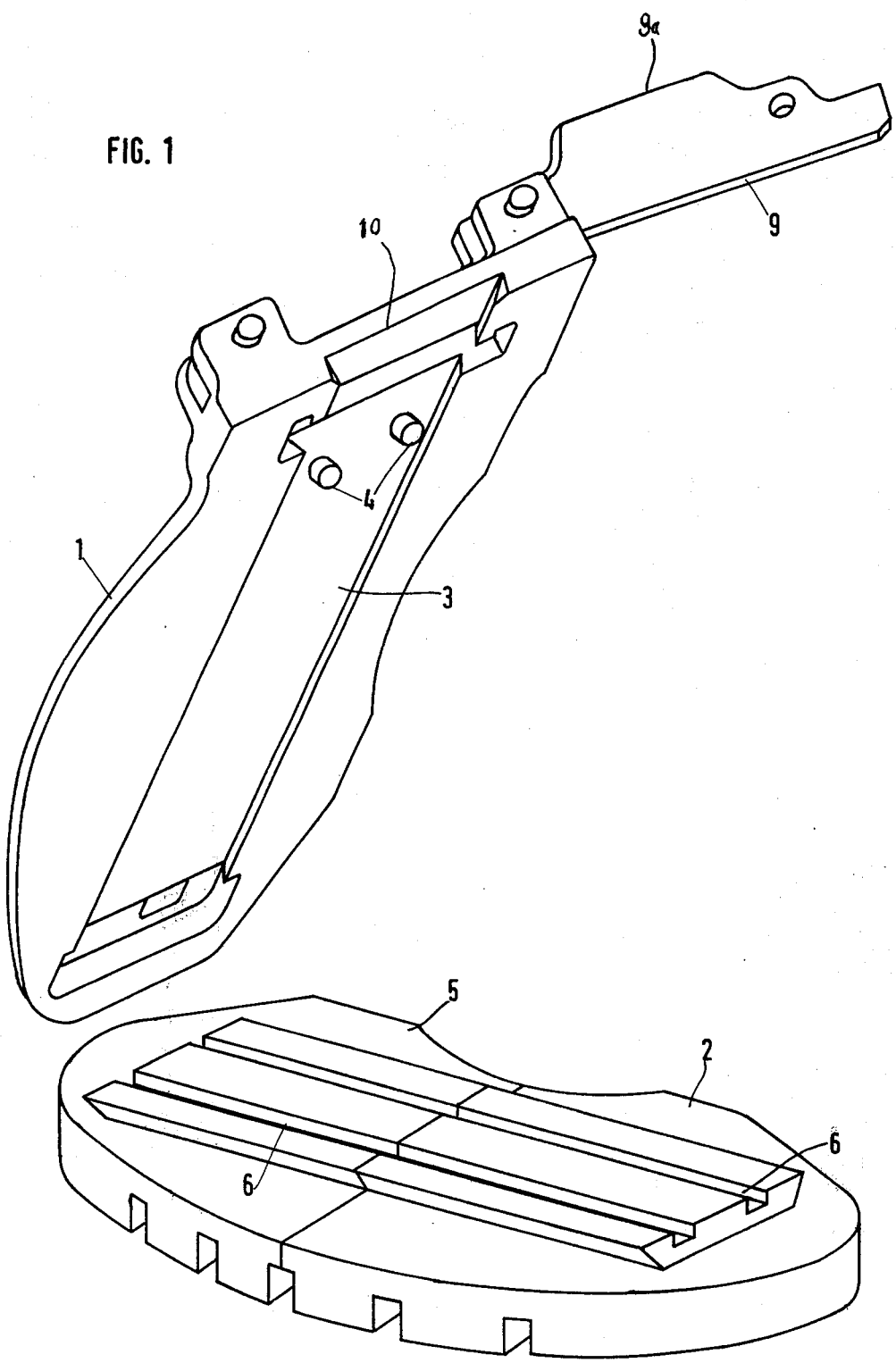

United States Patent [19]

Hochhuth et al.

[11] 3,957,139
[45] May 18, 1976

[54] GUIDE FOR MOUNTING A BRAKE LINING ONTO A BRAKE LINING SUPPORT OF A DISK BRAKE FOR VEHICLES

[75] Inventors: Curt Hochhuth, Minden, Westfalen; Hans Pollinger; Hans Gebhardt, both of Munich; Corneliu Mircea Popescu, Lohhof, all of Germany

[73] Assignee: Knorr-Bremse GmbH, Germany

[22] Filed: Feb. 6, 1975

[21] Appl. No.: 547,739

[30] Foreign Application Priority Data
Feb. 23, 1974  Germany............................ 7406362

[52] U.S. Cl. .............................................. 188/244
[51] Int. Cl.² .......................................... F16D 69/04
[58] Field of Search ............................ 188/234–236, 188/242–246, 250 G

[56] References Cited
UNITED STATES PATENTS

| 1,284,142 | 11/1918 | Printy | 188/244 |
| 2,900,711 | 8/1959 | Wilson | 188/242 X |

*Primary Examiner*—Duane A. Reger
*Attorney, Agent, or Firm*—Edmund M. Jaskiewicz

[57] ABSTRACT

In order to prevent the assembly of an unspecified brake lining onto a brake lining support for a brake shoe a face of the brake lining support is provided with guide means of a particular section and the mounting face of the brake lining is provided with counter-guide means having an inverted mirror section with respect to the brake lining support guide means. In this manner only a brake lining having a particular counter-guide means can be assembled on a brake lining support having a particular guide means.

5 Claims, 2 Drawing Figures

GUIDE FOR MOUNTING A BRAKE LINING ONTO A BRAKE LINING SUPPORT OF A DISK BRAKE FOR VEHICLES

The present invention relates to the mounting of a brake lining on a brake lining support of a brake shoe for railway and other vehicles, more particularly, to a guiding structure for assuring that a specified brake lining is mounted on a particular brake lining support.

Brake lining supports for disk brakes intended for use on railway and other vehicles have been constructed so that the brake lining can be inserted into a guide formed on the support. Guides of this kind are generally advantageous in that they facilitate the rapid replacement of the fricton brake linings when the latter become worn or damaged.

The brake linings generally employed by railroads can be classified as so-called L-linings, i.e., "low-friction" linings and H-linings, i.e., "high-friction" linings. In most cases, the linings and the guide structures thereon have the same dimensions and configuraton so that during the replacement of H-linings and L-linings it is readily possible that a mix-up may occur and one lining may be unintentionally used in place of the other. A high-friction lining may be inserted into the guide of a brake lining support for which a low-friction lining has been specified. Such a mix-up may result in damage to the brake lining or to the brake disk.

It is therefore the principal object of the present invention to provide a brake lining support of the type discussed above which would prevent any possibility of an unspecified brake lining being mounted on a brake lining support.

According to one aspect of the present invention, a brake shoe for a disk brake for railway and other vehicles may comprise a brake lining support having a face with means for retainimg a brake lining thereon. A brake lining is removably retained on the brake lining support face. The brake lining support face is provided with guide means having a predetermined section or profile. The face of the brake lining which is to be mounted against the said face of the brake lining support is provided with counterguide means which has an inverted mirror section with respect to the guide means so that only certain brake linings can be mounted on a given brake lining support.

The guide means may comprise one or more pins and the counter-guide means may comprise a correspondng number of grooves spaced to receive the pins. A guide means may also comprise a pin and a groove which coact with a corresponding groove and pin of the counter guide means.

Figure 2:
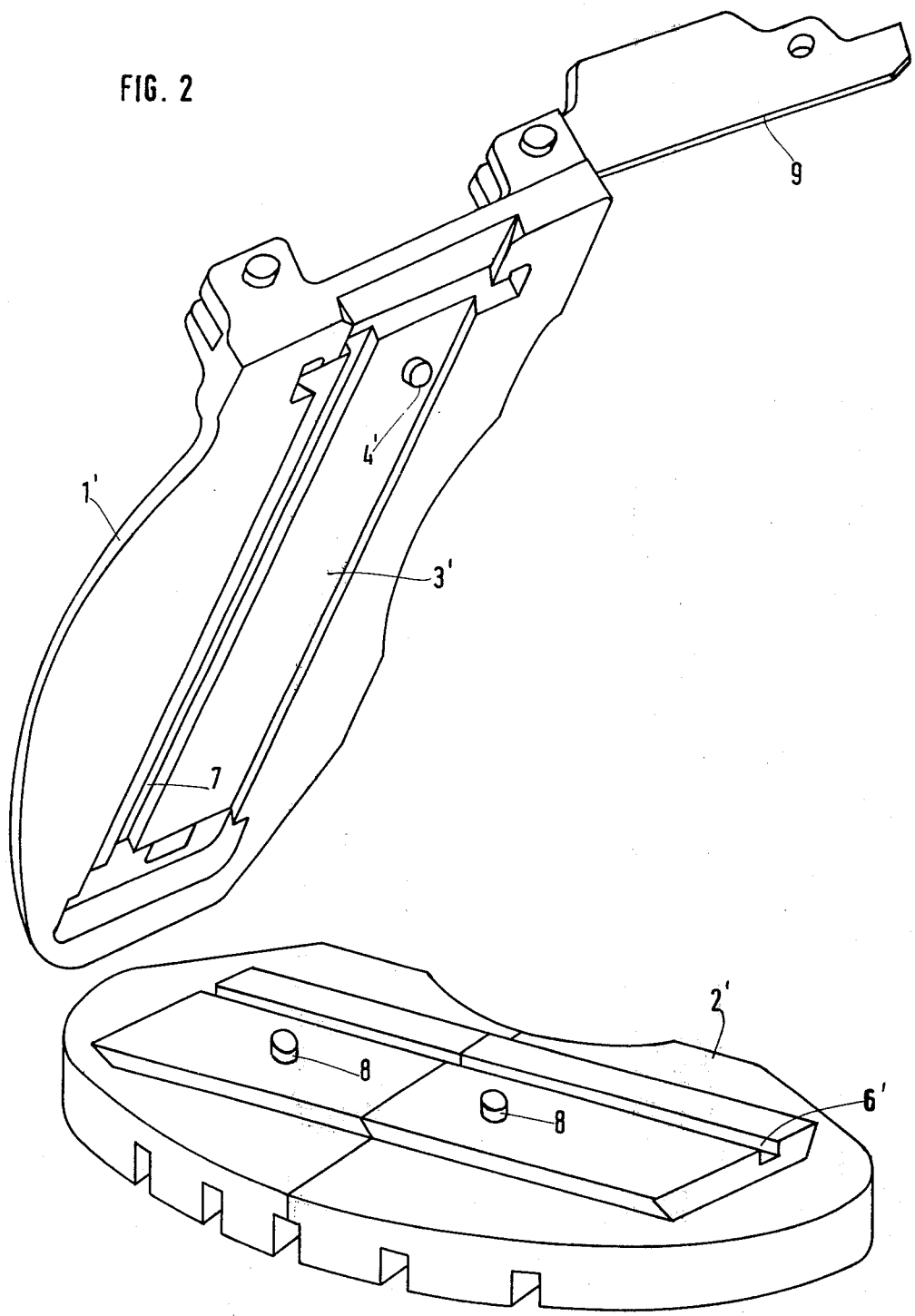

Other objects and advantages of the present invention will be apparent upon reference to the accompanying description when taken in conjuncton with the following drawings, which are exemplary, wherein:

FIG. 1 is a perspective view of a brake lining support and a brake lining for mounting on the support and showing the guide means consisting of a pair of pins and a counter-guide means on the brake lining comprising a pair of grooves; and FIG. 2 is a view similar to that of FIG. 1 but showing a modificaton of the guide means and counter-guide means on the brake lining support and brake lining respectively.

Proceeding next to the drawings wherein like reference symbols indicate the same parts throughout the various views a specific embodiment and modifications of the present invention will be described in detail.

In FIG. 1, a brake lining support 1 is shown in its open position and is provided with a guide structure having a section or profile in the form of two guide pins 4 positioned on a face 3 of the support which is to be directed toward a brake lining 2 to be mounted thereon. The guide pins 4 are spaced transversely to the direction of mounting the brake lining 2 on the support 1 and are positioned near the opening of the lining guide into which the brake lining is to be inserted. The brake lining 2 is provided with a counter-guide means comprising a pair of grooves 6 positioned on the rear face 5 of the brake lining 2. The position of the counter-groove 6 is in mirror inverted relationship with that of the guide pins 4 so that the guide pins are received in suitably dimensioned counter-grooves when the brake lining 2 is inserted into the brake lining support in a normal manner.

If the brake lining 2 illustrated in FIG. 1 corresponds to a high-friction lining, an H-lining described above, this lining can be mounted without any possibility of being confused with any other lining only in those brake lining supports that have the guide pin as illustrated in FIG. 1. The guide pins and counter-grooves engage each other because of their reciprocal spatial relationship and thus make possible only the combinaton of the brake lining support and brake lining of the type illustrated in FIG. 1.

For a relatively narrow brake lining it is possible to provide only a single guide pin in a predetermined position on the brake lining support and to provide a single counter-groove on the brake lining in a position correspondng in a mirror inverted relationship to the pin.

According to the modification of FIG. 2, the brake lining support 1' may be provided with a guide pin 4' and a guide groove 7 while the brake lining 2' is provided with a counter-pin 8 or a plurality of such pins and a counter-groove 6' positioned in a suitable mirror inverted relationship with the guide elements on the support. If the structure shown on FIG. 1 is employed for the H-lining it might be expedient to use the structure in FIG. 2 for an L-lining. It is therefore apparent that any mix-up of these linings having different frictional values is eliminated.

The brake linings may be of a single unitary piece or may be formed of a plurality of pieces such as shown in the drawing. In the case of a multi-part structure for the brake lining it is preferable to provide on each section of the lining the particular counter-guide structure for that type of lining as shown by the two counter-pins 8 in FIG. 2. In any particular case it may also be sufficient to provide the grooves only within the particular insertion length of the friction lining.

After a brake lining 2 is mounted on a brake lining support so as to be retained thereon by the dovetail groove and guide relationship shown in the drawings the brake lining is locked in position in a known manner by means of a latch 9 which pivots in a plane perpendicular to the direction of insertion of the lining and is provided with a tongue 9a which projects through an opening 10 in the brake lining support to block the upper end of the brake lining.

It is pointed out that when the brake lining is formed of a plurality of components only those components corresponding to the guide structure on the brake lining support can be positioned one after the other onto the retaining means of the support. It is thus, not possible to intermix parts of different types of brake linings on a single brake lining support.

It will be understood that this invention is susceptible to modification in order to adapt it to different usages and conditions, and accordingly, it is desired to comprehend such modifications within this invention as may fall within the scope of appended claims.

What is claimed is:

1. In a brake shoe for a disk brake for railway and other vehicles, a brake lining support having a face with means for retaining a brake lining thereon, a brake lining removably retained on said brake lining support face, said retaining means comprisng a dovetail groove in said brake lining support face and a dovetail guide on said brake lining insertable into said dovetail groove, guide means on said brake lining support face groove having a predetermined section, and counter-guide means on a face of said brake lining dovetail guide directed toward said brake lining support face and having an inverted mirror section with respect to said guide means so as to permit only a particular brake lining to be slidably insertable into a brake lining support.

2. In a brake shoe as claimed in claim 1 wherein said guide means comprises a pin and said counter-guide means comprises a groove receiving said pin.

3. In a brake shoe as claimed in claim 1 wherein said guide means comprises two pins spaced in a direction transverse to the inserting movement of said brake lining onto said brake lining support, said counter-guide means comprising two grooves receiving said pins.

4. In a brake shoe as claimed in claim 1 wherein said guide means comprises a first pin and a first groove, said counter-guide means comprises a second groove receiving said first pin and a second pin receivable in said first groove.

5. In a brake shoe as claimed in claim 1 wherein said brake lining comprises a plurality of parts.

* * * * *